July 7, 1964 R. H. GAUCHAT 3,139,769
ROTARY LOCKING DEVICE
Filed Aug. 30, 1962 3 Sheets-Sheet 1

INVENTOR.
Richard H. Gauchat,
BY
H. H. Losch
Paul S Collignon Attys.

July 7, 1964  R. H. GAUCHAT  3,139,769
ROTARY LOCKING DEVICE
Filed Aug. 30, 1962  3 Sheets-Sheet 2

● — IN SLOT
○ — OUT OF SLOT

INVENTOR.
Richard H. Gauchat,
BY
N. H. Loach
Paul S. Collignon  Att'ys.

July 7, 1964  R. H. GAUCHAT  3,139,769
ROTARY LOCKING DEVICE
Filed Aug. 30, 1962  3 Sheets-Sheet 3

INVENTOR.
Richard H. Gauchat,
BY
Att'ys.

3,139,769
ROTARY LOCKING DEVICE
Richard H. Gauchat, 1525 E. 73rd St., Indianapolis, Ind.
Filed Aug. 30, 1962, Ser. No. 220,965
5 Claims. (Cl. 74—565)
(Granted under Title 35, U.S. Code (1952), sec. 266)

The invention described herein may be manufactured and used by or for the Government of the United States of America for governmental purposes without the payment of any royalties thereon or therefor.

The present invention relates to a safety locking device and more particularly to a locking device that can be applied to an electrical component such as a rotary switch, potentiometer, or the like, to prevent accidental rotation thereof and further, to require a very definite sequence of operations in order to rotate an electrical device, such as a switch, to its various positions.

Control panels, such as those used in aircraft, often have large numbers of electrical components such as switches and potentiometers, and because of space limitations these components are often mounted closely together. Consequently, it is very likely that a component may be unintentionally rotated when it should not be, which could create an unsafe condition.

Various locking devices have been provided to prevent accidental rotation of a rotary device. One well-known device is described in U.S. Patent 2,917,942, "Rotary Locking Device," which issued December 22, 1959, to John W. Jarrett and Everett L. Rice. This patented device comprises a shaft that is axially slidably attached to the existing shaft of an electrical component, and the attached shaft has at least one lug that is engageable with a plurality of slots in a shaft bushing. The attached shaft is resiliently biased outwardly to retain the lugs within one of the slots and when in this position, the attached shaft is locked from rotation. When it is desired to rotate the attached shaft, it is first necessary to move it inwardly until the lug is disengaged from the slot. The shaft is then free to be rotated. However, the disadvantage of this patented device resides in the fact that once the attached shaft is moved inwardly, then the shaft is free to be rotated to any angular position and thus the shaft can be accidentally rotated to a position that would create an unsafe condition. For example, in a bomb arming system it may be necessary to turn a shaft to several warm-up positions, or test positions, before turning to an arming position and no heretofore known device can provide the necessary safety function of permitting rotation to a plurality of positions and providing locking means for each position.

The locking device disclosed herein is adaptable for mounting to many heretofore available components and requires only a very minor modification of the component to be operable thereon. The locking device is provided with a cylindrical housing that is attached to the threaded portion of the component, and a shaft carried by the housing is axially slidably attached to the existing shaft of an electrical component. A pair of locking pins are provided on the attached shaft, and these pins are engageable with a locking plate which limits the amount of rotational travel of the attached shaft. In order to obtain additional rotation, the pins must be shifted axially, that is, an alternating push-pull motion is required in order to turn the attached shaft to its various positions. Thus any accidental rotation can be avoided, as a very definite pattern of operation is required.

It is therefore a general object of the present invention to provide a safety attachment for existing components which will prevent accidental shaft rotation of an electrical device.

Another object of the present invention is to provide a safety locking device that will restrict the amount of rotation of a shaft.

Still another object of the present invention is to provide a safety locking device that requires an alternate push-pull motion in order to continue rotation of a shaft.

Other objects and many of the attendant advantages of the present invention will be readily appreciated as the same becomes better understood by reference to the following detailed description when considered in connection with the accompanying drawing wherein.

Figure 1:
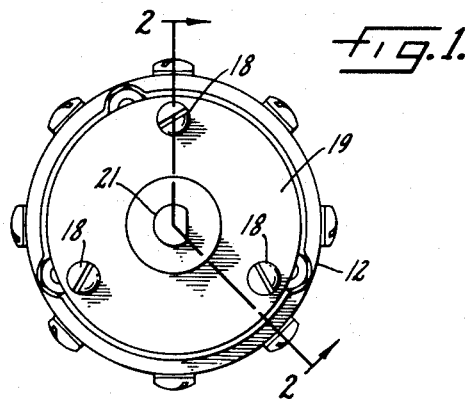
FIGURE 1 is a plan view showing the shaft end of one embodiment of the present invention.
Figure 2:
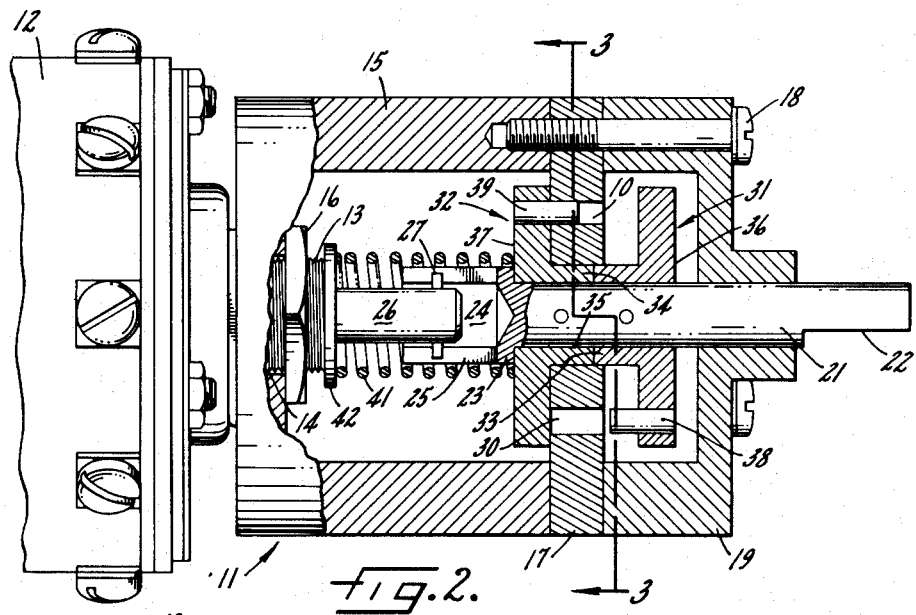
FIGURE 2 is a partial sectional view taken on line 2—2 of FIGURE 1.
Figure 3:
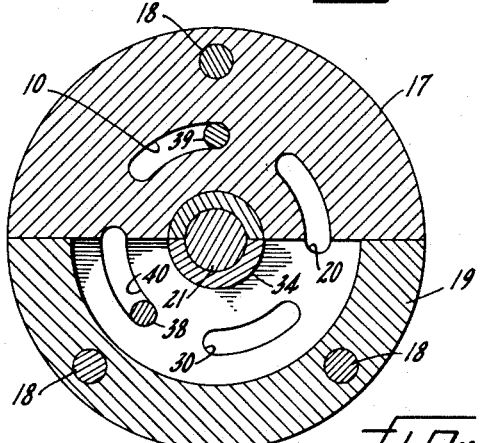
FIGURE 3 is a sectional view taken on line 3—3 of FIGURE 2.

Referring now to FIGURES 1, 2, and 3 of the drawings, there is shown a locking device 11 that is attached to an electrical component 12, such as a rotary switch or potentiometer. The attachment is made by passing the threaded portion 13 of the electrical component 12 through a hole 14 in one end of a cylindrical housing 15 and then tightening a locking nut 16 onto the threaded portion 13.

A locking plate 17 is provided on one end of cylindrical housing 15 and is attached thereto by means of screws 18 that also attach an end cap 19 to the cylindrical housing 15. A plurality of arcuate slots are provided in locking plate 17, four being shown for purposes of illustration and have been numbered 10, 20, 30, and 40. A shaft 21 is rotatably supported by end cap 19, and one end of shaft 21, which extends outwardly from end cap 19 is provided with a flat portion 22 for facilitating the fastening of a knob (not shown). The other end of shaft 21 is provided with an enlarged diameter portion 23 that has a bore 24 and a slot 25 that permits the coupling of shaft 21 to shaft 26 of electrical component 12. A pin 27 is press-fitted through shaft 26 and slot 25 is slidably engageable with pin 27. This arrangement permits shaft 21 to be slidably movable relative to shaft 26 and yet any rotation of shaft 21 will be imparted to shaft 26.

As best shown in FIGURE 2 of the drawing, a pair or rotors 31 and 32 are pinned to shaft 21. Rotors 31 and 32 are provided with hubs 33 and 34, respectively, that slidably engage hole 35 in locking plate 17 and as at least one of the hubs is always positioned within hole 35, shaft 21 is stabilized at its inner end. Rotors 31 and 32 are also provided with flanges 36 and 37, respectively, and stop pins 38 and 39 are provided on these flanges and are engageable in the slots 10, 20, 30, and 40. Pins 38 and 39 are staggered such that at least one of the pins is engaged in one of the arcuate slots 10, 20, 30, or 40. Spring 41 is provided between washer 42 and rotor 32 to bias shaft 21 outwardly.

Figure 4A:
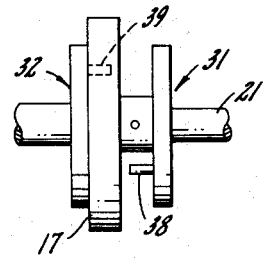
FIGURE 4(a) is a diagrammatic side view showing a first stop position of a rotatable shaft.
Figure 4B:
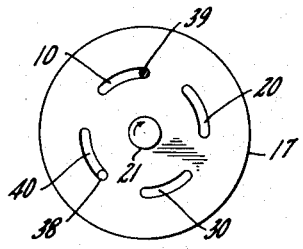
FIGURE 4(b) is a diagrammatic end view corresponding to the view of FIGURE 4(a)
Figure 4C:
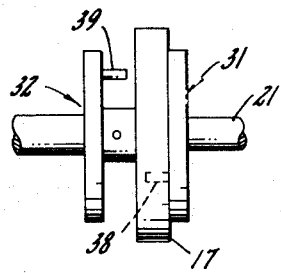
FIGURE 4(c) is a diagrammatic side view showing the rotatable shaft of FIGURE 4(a) laterally shifted whereby said shaft is free to be additionally rotated.
Figure 4D:
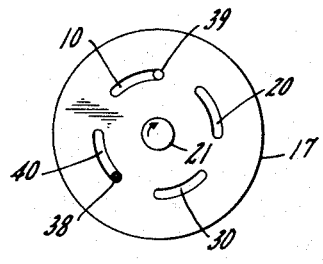
FIGURE 4(d) is a diagrammatic end view corresponding to the view of FIGURE 4(c)
Figure 4E:
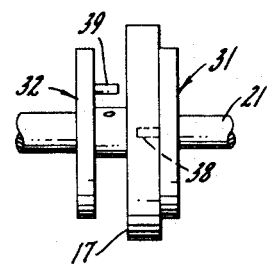
FIGURE 4(e) is a diagrammatic side view showing a second stop position.
Figure 4F:
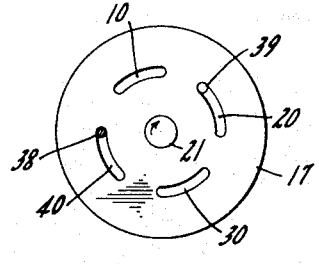
FIGURE 4(f) is a diagrammatic end view corresponding to the view of FIGURE 4(e)

The operation of the embodiment shown in FIGURES 1 to 3 of the drawings can best be described by reference to FIGURES 4(a) through 4(f). Assuming that shaft 21 is being rotated in a clockwise direction, as shown in FIGURES 4(a) and 4(b), it can be seen that pin 39 has traveled to the end of slot 10 whereon rotation of shaft 21 is stopped. It can also be seen in FIGURES 4(a) and 4(b) that pin 38 is aligned with the beginning of arcuate slot 40, but that pin 38 is not yet engaged in arcuate slot 40. In order to rotate shaft 21 additionally, it is now necessary to axially move shaft 21 inwardly which causes pin 39 to become disengaged with arcuate slot 10 and for pin 38 to become engaged in arcuate slot 40, as shown in FIGURES 4(c) and 4(d) of the drawings. Shaft 21 can now be rotated in a clockwise direction until pin 38 reaches the end of arcuate slot 40, as shown in FIGURES 4(e) and 4(f) of the drawing. It can also be seen that pin 39 is aligned with the beginning of arcuate slot 20. For additional rotation, it is now necessary to move shaft 21 outwardly and thus disengage pin 38 from arcuate slot 40 and engage pin 39 with arcuate slot 20. Shaft 21 can now be rotated until pin 39 reaches the end of arcuate slot 20 whereupon pin 39 is then aligned with the beginning of arcuate slot 10. It can thus be seen that in order for shaft 21 to be fully rotated, an alternating push-pull motion of shaft 21 is required.

Figure 5:
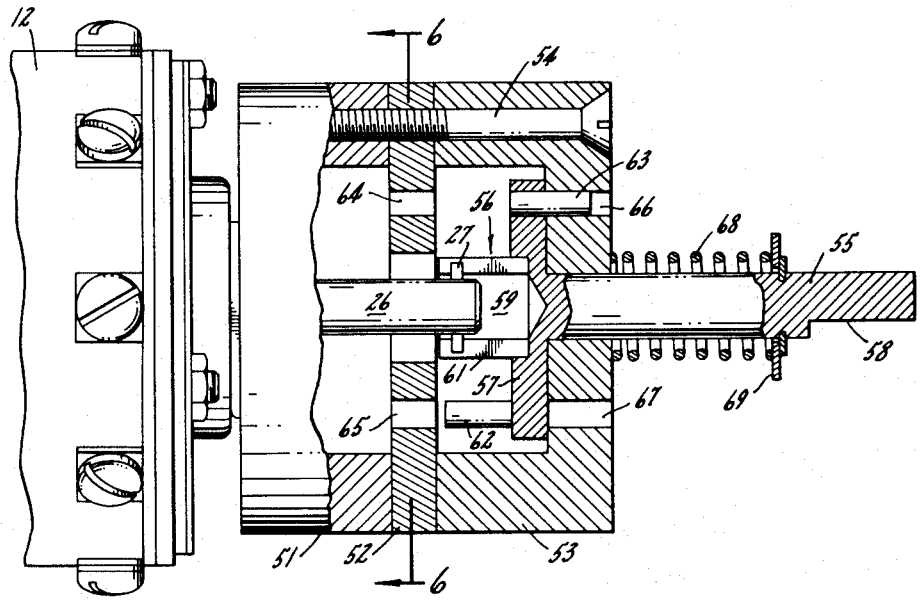
FIGURE 5 is a partial sectional view similar to FIGURE 2 only showing another embodiment of the present invention.

Referring now to FIGURE 5 of the drawings, another embodiment of the present invention is shown that is more compact than the previously described embodiment. A cylindrical housing 51 is attached to electrical component 12, and locking plate 52 and end cap 53 are attached to housing 51 by means of screws 54. Shaft 55 is rotatably positioned in end cap 53 and is provided with an enlarged diameter portion 56, a flange 57, and a flat portion 58 on its outer end to facilitate the fastening of a knob (not shown). The enlarged diameter portion 56 is provided with a bore 59 and a slot 61 that permits the coupling of shaft 55 to shaft 26 of electrical component 12.

A pair of stop pins 62 and 63 are provided on flange 57 and are engageable with arcuate slots that are provided in both locking plate 52 and end cap 53. Pin 62 is engageable with either arcuate slot 64 or 65 in locking plate 52 and pin 63 is engageable with either arcuate slot 66 or 67 in end cap 53. The stop pins and arcuate slots are so arranged that one of the stop pins is always engaged in one of the arcuate slots and when a pin has reached the end of an arcuate slot the other pin has reached a beginning of an arcuate slot. A spring 68 is provided between washer 69 and end cap 53 for biasing shaft 55 outwardly.

Figure 6:
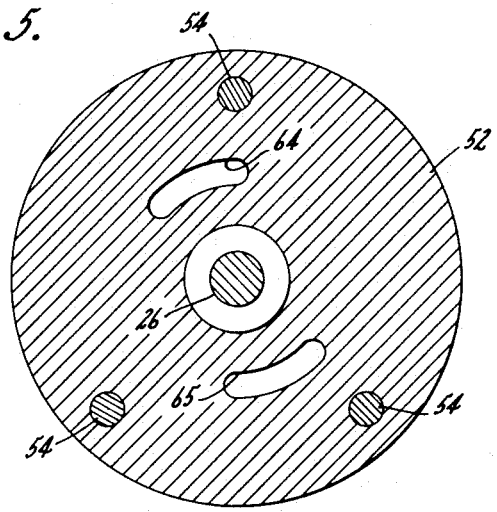
FIGURE 6 is a sectional view taken on line 6—6 of FIGURE 5.

The operation of the embodiment shown in FIGURES 5 and 6 of the drawing is similar to the operation of the embodiment shown in FIGURES 1 to 3. For example, when pin 63 has reached the end of arcuate slot 66, pin 62 is aligned with the beginning of arcuate slot 65 and by axially moving shaft 55 inwardly, pin 63 becomes disengaged from arcuate slot 66 and pin 62 becomes engaged with arcuate slot 65. When shaft 55 is moved axially inwardly, spring 68 is compressed which has a tendency to move shaft 55 outwardly. However, one shaft 55 is slightly rotated and pin 63 leaves arcuate slot 66, pin 63 will prevent shaft 55 from moving axially outwardly until pin 63 can again enter either arcuate slot 66 or 67.

It is the functions of spring 41 in the first described embodiment and of spring 68 in the latter described embodiment to provide tension on the respective shafts 21 and 55 so that when the pins are at the end positions of the slot, and free to make a transfer, the respective shafts will not be completely free to slide and cause an undesirable noise or vibration. Also, the presence of the respective springs requires a very definite operation by an operator who is turning a shaft, that is, he can turn a knob until a stop is encountered, and then he must push inwardly against the spring and then again turn the knob.

It can thus be seen that the present invention provides an improved locking device for rotary switches and the like in that it is necessary to provide a very definite motion in order to continue to rotate a shaft. Thus each position of a rotary switch can only be reached by following a very definite procedure that is, for example, turn, push in, turn, pull out, turn, etc. It can thus be seen that the accidental rotation of a shaft to various positions is not likely to occur unwittingly, as an operator is required to follow a definite pattern of operation.

Obviously many modifications and variations of the present invention are possible in the light of the above teachings. It is therefore to be understood that the invention may be practiced otherwise than as specifically described.

What is claimed is:

1. A locking device for an electrical component comprising:
   a cylindrical housing having an open end and being attached to the shaft end of an electrical component having a rotatable shaft,
   a locking plate enclosing said open end of said cylindrical housing and having a plurality of arcuate slots therein,
   an attached shaft drivably connected to and in axially slidable engagement with said rotatable shaft of said electrical component, and
   rotor means connected to said attached shaft and having first and second stop pins thereon, said pins being angularly displaced from one another whereby axial movement of said attached shaft causes said first and second pins to be positioned in different arcuate slots.

2. A locking device for an electrical component comprising:
   a cylindrical housing having an open end and being attachable to the shaft end of an electrical component having a rotatable shaft,
   a locking plate enclosing said open end of said cylindrical housing and having a plurality of arcuate slots therein,
   an attached shaft passing through said locking plate and being drivably connectable to and axially slidably engageable with said rotatable shaft of said electrical component,
   first and second rotors attached to said attached shaft and being disposed on opposite sides of said locking plate, and
   means on each said rotor selectively engageable with said arcuate slots in said locking plate.

3. A locking device for an electrical component comprising:
   a cylindrical housing having an open end and being attachable to the shaft end of an electrical component having a rotatable shaft,
   a locking plate enclosing said open end of said cylindrical housing and having a plurality of arcuate slots therein,
   an attached shaft passing through said locking plate and being drivably connectable to and axially slidably engageable with said rotatable shaft of said electrical component,
   a first rotor connected to said attached shaft on one side of said locking plate and having a first pin engageable with said arcuate slots, and
   a second rotor connected to said attached shaft on the side opposite said locking plate that said first rotor is attached, and having a second pin engageable with said arcuate slots, said second pin being angularly displaced from said first pin whereby axial movement of said attached shaft positions said first and second pins in different arcuate slots.

4. A locking device for an electrical component comprising:
- a housing having first and second cylinder halves, said first cylinder half being attached to the shaft end of an electrical component having a rotatable shaft, and said second cylinder half having a plurality of arcuate slots in the end thereof,
- a locking plate positioned between said cylinder halves and having a plurality of arcuate slots therein,
- a rotor shaft rotatably supported by said second cylinder half having a flange and being drivably connected to and in axially slidable engagement with said rotatable shaft of said electrical component, and
- stop means attached to said flange adaptable for alternatingly engaging said arcuate slots in said locking plate and said arcuate slots in said second cylinder half.

5. A locking device for an electrical component as set forth in claim 4 wherein said stop means comprises first and second pins, said first pin being positioned on one side of said flange and said second pin being positioned on the opposite side of said flange.

References Cited in the file of this patent

UNITED STATES PATENTS

| | | |
|---|---|---|
| 590,940 | Ayer | Sept. 28, 1897 |
| 858,538 | Remington | July 2, 1907 |
| 1,365,325 | Johnston | Jan. 11, 1921 |
| 1,797,737 | Tenney | Mar. 24, 1931 |
| 2,498,651 | Crom | Feb. 28, 1950 |
| 2,819,844 | Dennick | Jan. 14, 1958 |
| 2,917,942 | Jarrett et al. | Dec. 22, 1959 |

FOREIGN PATENTS

| | | |
|---|---|---|
| 557,941 | Great Britain | Dec. 13, 1943 |
| 828,940 | Germany | Jan. 21, 1952 |